(12) United States Patent
Brönnimann

(10) Patent No.: US 7,506,580 B2
(45) Date of Patent: Mar. 24, 2009

(54) PRESSING DEVICE

(75) Inventor: Martin Brönnimann, Itringen (CH)

(73) Assignee: Rego-Fix AG, Tenniken (CH)

( * ) Notice: Subject to any disclaimer, the term of this patent is extended or adjusted under 35 U.S.C. 154(b) by 0 days.

(21) Appl. No.: 11/842,266

(22) Filed: Aug. 21, 2007

(65) Prior Publication Data

US 2008/0072773 A1   Mar. 27, 2008

(30) Foreign Application Priority Data

Aug. 24, 2006  (CH) ................... 13501/06

(51) Int. Cl.
*B23P 19/04* (2006.01)
(52) U.S. Cl. ............. 100/269.01; 100/214; 100/269.17; 29/237; 29/238
(58) Field of Classification Search ................. 100/214, 100/226, 229 R, 269.01, 909, 918, 269.17; 29/237, 238, 239, 281.1, 251, 252, 283.5
See application file for complete search history.

(56) References Cited

U.S. PATENT DOCUMENTS

| 4,022,123 A | * | 5/1977 | Bachmann | ............... 100/229 R |
| 4,418,458 A | * | 12/1983 | Hunter | ........................ 29/237 |
| 4,768,269 A | * | 9/1988 | Williams | ..................... 29/225 |
| 5,323,697 A | * | 6/1994 | Schrock | ...................... 100/232 |
| 7,059,030 B2 | * | 6/2006 | Gerber | ........................ 29/237 |

FOREIGN PATENT DOCUMENTS

| DE | 19503436 | 11/1995 |
| DE | 102004016305 | 12/2004 |
| GB | 2240599 | 8/1991 |

\* cited by examiner

*Primary Examiner*—Jimmy T Nguyen
(74) *Attorney, Agent, or Firm*—Hoffmann & Baron, LLP

(57) ABSTRACT

The pressing device serves for the relative axial movement of two parts, which are arranged coaxially with respect to one another and are moveable relative to one another only by high pressing power. The pressing device has one fixed pressure plate and one pressure plate which is moved axially by hydraulic cylinders and an insert which is to be placed around the parts which are to be pressed. The insert is held closed by means of a closure door which is articulatedly mounted on the moving part of the pressing device. The pressure cylinders are arranged as close as possible to the center of pressure, that is to say to the axis of the parts which are to be pressed.

1 Claim, 4 Drawing Sheets

PRESSING DEVICE

CROSS REFERENCE TO RELATED APPLICATIONS

This application claims the benefit of Switzerland Application No. CH 01350/06, filed Aug. 24, 2006, the contents of which are incorporated herein by reference.

FIELD OF THE INVENTION

The present invention relates to a pressing device for the relative axial movement of two parts, which are arranged coaxially with respect to one another and are moveable relative to one another only by means of a high pressing power, having one fixed pressure plate and one pressure plate which is guided by hydraulic cylinders and is moved axially relative thereto, having an insert which is to be placed around the parts which are to be pressed, and having a closure door which holds the insert closed.

BACKGROUND OF THE INVENTION

Pressing processes of said type are for example used in the pressing of tube ends or shaft connections. High pressing powers are required because the friction of a close fit must be overcome and, in many cases, an additional deformation of material must be brought about. A typical example is the pressing-in and pressing-out of collet chucks or sleeves into and out of corresponding tool or collet chuck holders in machine tools.

For certain embodiments of tool receptacles, in particular those with little or no conicity of the collet chuck and holding cone, such as are preferred for machines with very high rotational speeds, the collet chucks or sleeves with the inserted tool shank cannot be directly inserted into the receptacle of the collet chuck holder and fixed with a clamping nut, or inversely be extracted after the release of the clamping nut, but must be pressed in and out again with a high pressure.

There are various solutions for said pressing-in and pressing-out processes; on the one hand, those in which the devices for generating the required axial forces are part of the clamping device, and on the other hand, separate pressing-in and pressing-out devices. The latter have been fundamentally proven because they do not lead to a complication of the clamping device. A device of said type is for example known in which an insert, which engages coaxially around the parts which are to be pressed, in a pressing device holds suitable flanges of the parts which are to be moved towards one another. The insert itself can be inserted and removed through a closure door which is arranged on one side of the device, and is held closed during the pressing process by a pressure pin. The closure door is articulatedly mounted on the fixed pressure plate. The relative movement of the pressure pin with respect to the moving pad of the insert during the pressing process results, despite a friction-reducing spherical design of the pressure pin, in indentations in the material and in material wear. Furthermore, the pressure action on the moving pad changes during the pressing process, which can lead to its opening.

SUMMARY OF THE INVENTION

The invention is based on the object of creating a simple and universally useable pressing device which is free from the disadvantages of known devices of said type.

Said object is achieved according to the invention by means of a pressing device of the type specified in the introduction which is characterized in that the closure door is articulatedly mounted on the moving part of the pressing device and the pressure cylinders are arranged outside separately formed guide elements.

A pressing-in and pressing-out device for flat-cone collet chucks as a preferred embodiment of the invention is described below on the basis of the appended drawings, in which:

DETAILED DESCRIPTION OF THE INVENTION

The pressing device shown in the figures for pressing in and pressing out a flat-cone collet chuck into and out of a collet chuck holder is composed of a lower, fixed pressure plate 1, an upper, axially moveable pressure plate 2, and an insert 3.

Figure 1:
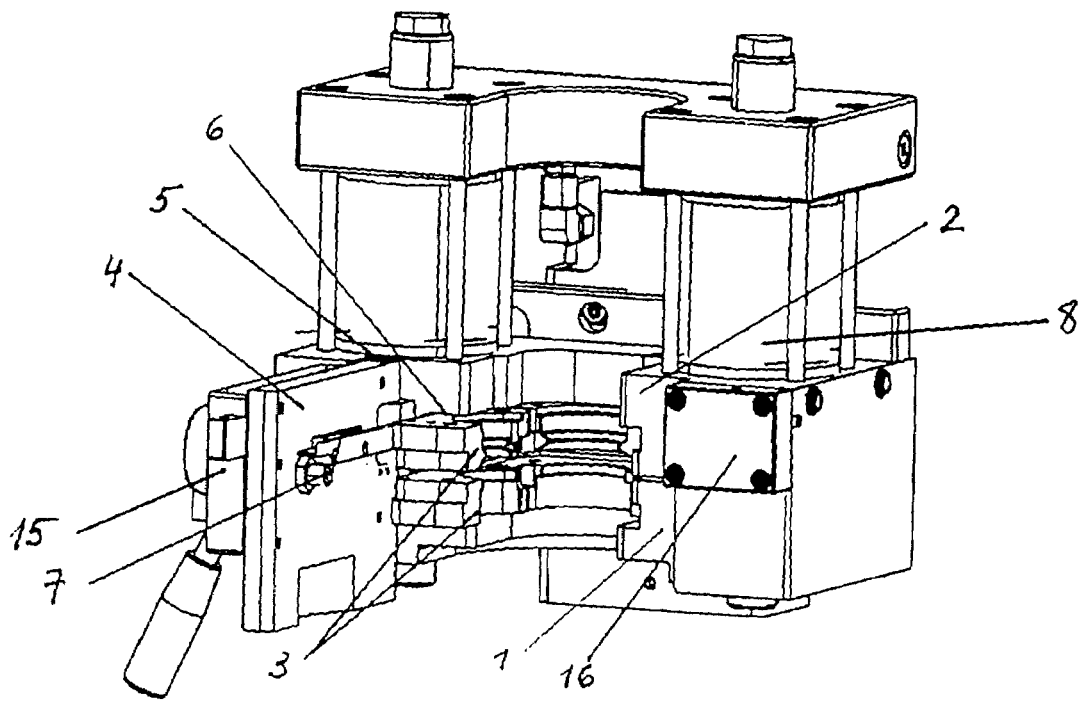
FIG. 1 shows a perspective view of a pressing device.
Figure 4:
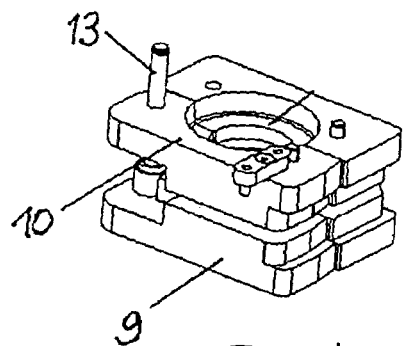
FIG. 4 shows a perspective view of an insert in the pressing device.
Figure 5:
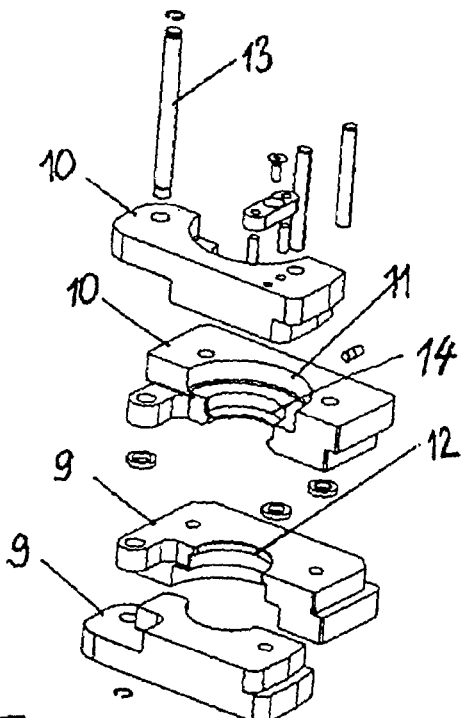
FIG. 5 shows an exploded illustration of the insert.
Figure 2:
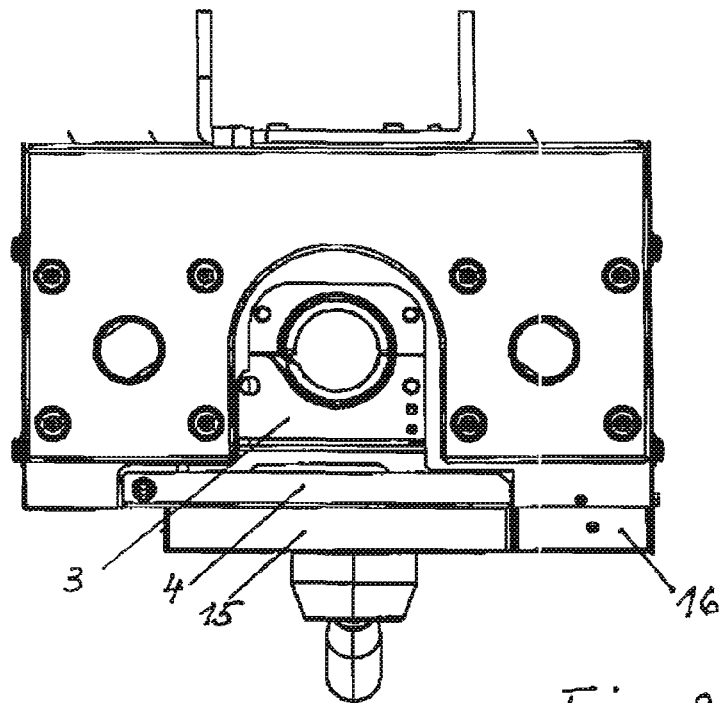
FIG. 2 shows a plan view with the door closed.
Figure 3:
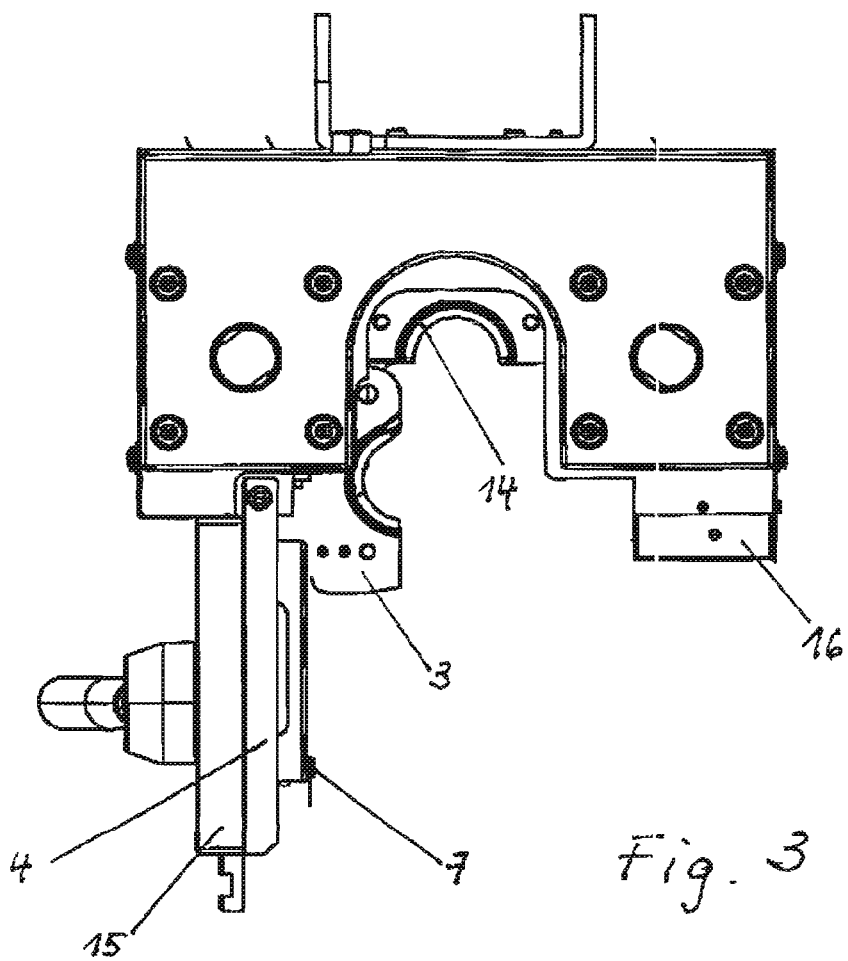
FIG. 3 shows a plan view with the door open.
Figure 6:
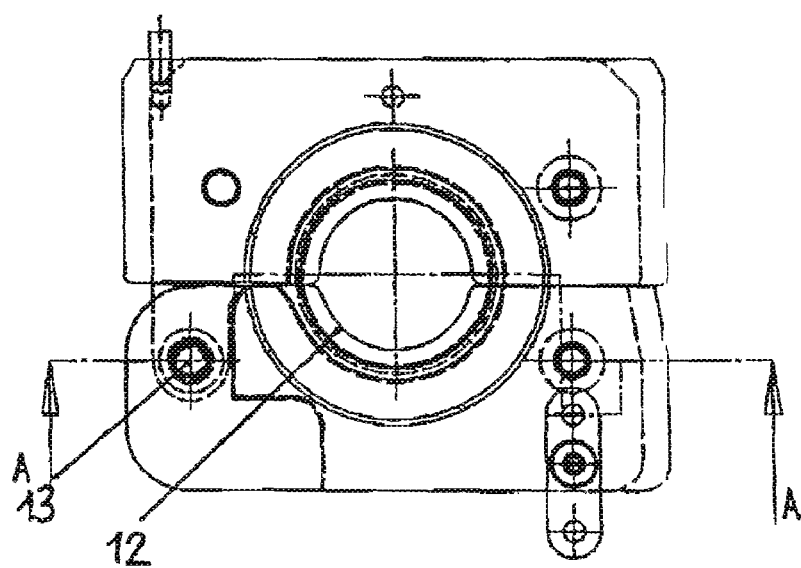
FIG. 6 shows a plan view of the insert.
Figure 7:
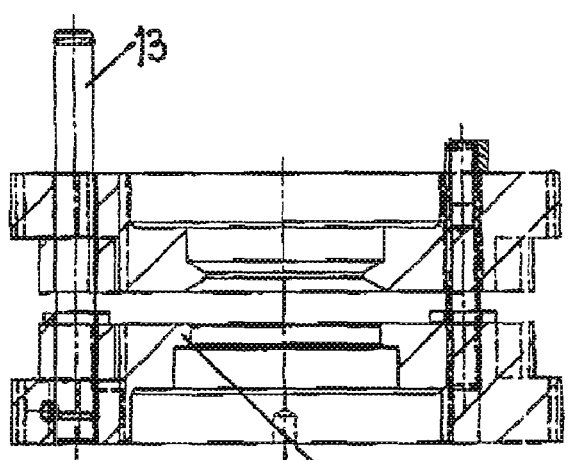
FIG. 7 shows a section through the insert along the line A-A in FIG. 6.

As can be seen from the plan view of FIGS. 2 and 3, the upper pressure plate is of substantially U-shaped design. At its open side, a closure and holding door 4 is articulatedly mounted by means of a hinge 5 on the end of one side limb of the pressure plate. The lower pressure plate 1 has the same U shape as the upper pressure plate 2 and is therefore likewise open at one side. At the sides which face towards one another, the pressure plates have recesses 6 for receiving the insert 3.

The closure and holding door 4 has, at its side opposite the hinge, a closure mechanism 15 with a bar which, for closing, engages into a corresponding closing element 16 on the other side limb of the upper pressure plate. At its inner side, the door has a pressure pin 7 in the region of the closure mechanism.

Hydraulic cylinders 8 carry out the guidance and the pressing between the pressure plates in a way known per se. The hydraulic cylinders 8 are arranged as close as possible to the centre of pressure or to the axis in order to keep bending of the pressure plates as low as possible.

The insert is composed of lower pads 9 and upper pads 10. The pads have semi-circular recesses 11 which are situated opposite one another and completely enclose the parts, the collet chuck 21 and the collet chuck holder 20, which are to be pressed. For this purpose, the lower pads have an encircling engagement edge 12 which has a shape suitable for engagement into a corresponding groove 23 of the collet chuck holder 20.

Figure 8:
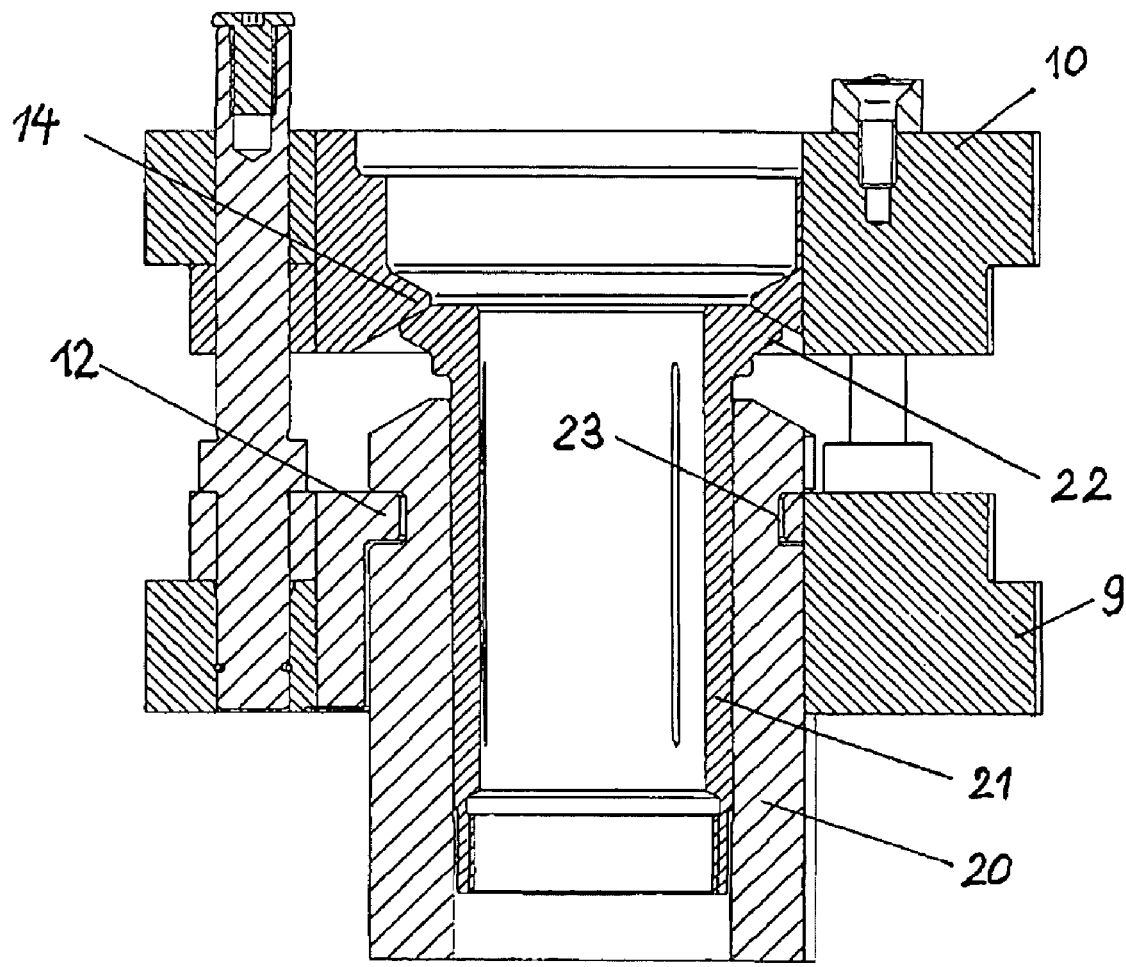
FIG. 8 shows a partial cross-section of the invention with the insert attached.

For pressing in or pressing out, the insert with the collet chuck holder 20 and the collet chuck 21 placed therein as shown in FIG. 8 is inserted into the recesses 6 when the door 4 is open. As the door is closed, the pressure pin 7 is pressed against the front, upper pad. This has the result that said pad can absorb the high radial forces occurring at the bevelled faces during pressing, and opening of the front half-shell of the insert is prevented.

The pressing-in or pressing-out process is the same as in known devices of said type. For pressing in, as can be seen in FIG. 8, the collet chuck holder 20 and the collet chuck 21 are inserted between the two half-shells of the insert, and the insert is closed and secured by closing the door. The upper pressure plate 2 and therefore the upper pad 10 of the insert are pressed downwards, and the collet chuck 21 is pressed into the receptacle, by means of the hydraulic cylinders. In this way, a radial pressure is exerted on the collet chuck 21 and, as a result of its elastic deformation, on a tool shank.

For pressing out, the pressed parts are in the same way placed in the insert, but with the upper pressure plate firstly being moved so far downwards by means of a functional pre-selection that the engagement edge of the upper pad 10 engages under the flange 22 of the collet chuck 21.

When the hydraulic cylinders are actuated, the upper pressure plate moves upwards and pulls the collet chuck holder from the collet chuck. In this way, the radial pressure on the collet chuck and on the tool shank is released, such that the tool can be removed.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A pressing device for relative axial movement of two parts, which are arranged coaxially with respect to one another and are moveable relative to one another only by high pressing power, the pressing device comprising:

one fixed pressure plate and one movable pressure plate which is guided by hydraulic cylinders and is moved axially relative thereto;

an insert which is to be placed around the parts which are to be pressed, the insert having fixed pads and moving pads; and a closure door which holds the insert closed, the closure door is provided with a pressure pin, and the closure door is articulately mounted on the movable pressure plate, wherein when the door is closed, the pressure pin presses against the moving pad of the insert.

* * * * *